(No Model.)
H. HILD.
DUMP WAGON.
No. 440,034. Patented Nov. 4, 1890.
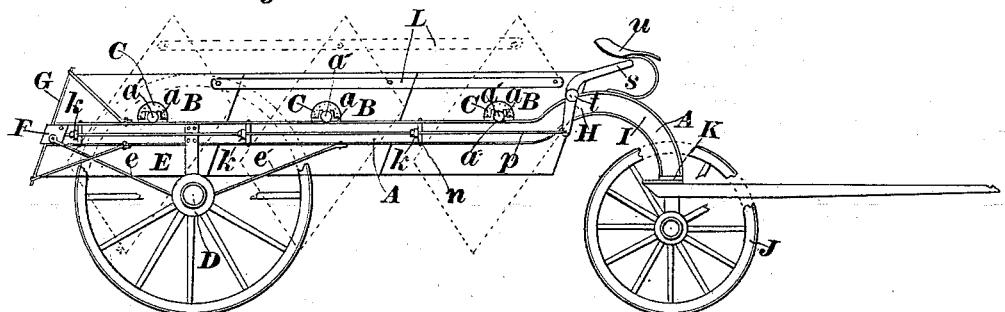
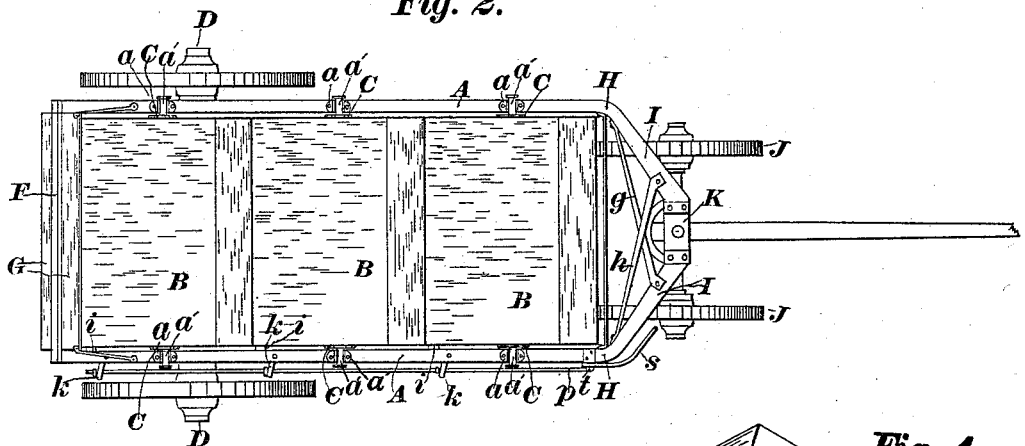
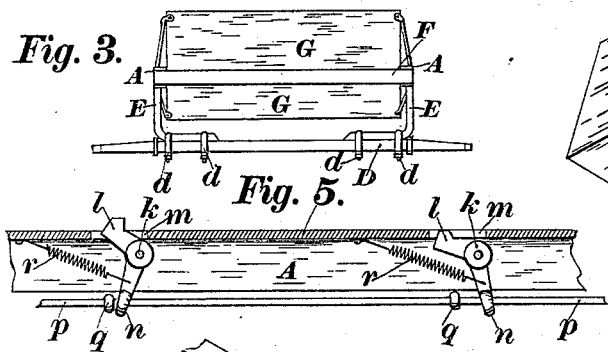
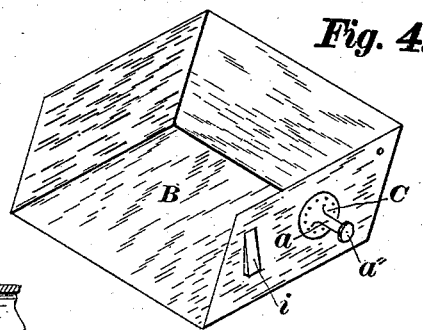
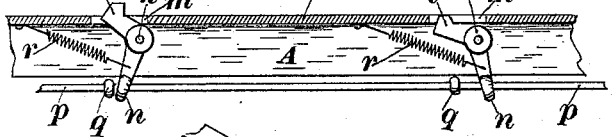
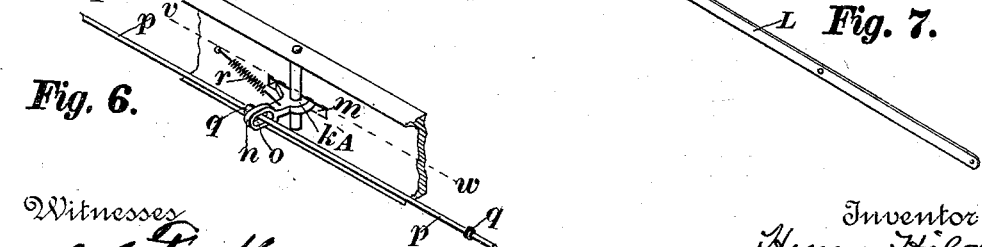
Witnesses
Inventor
Henry Hild
By his Attorney
Oscar Snell
THE NORRIS PETERS CO., PHOTO-LITHO., WASHINGTON, D. C.

UNITED STATES PATENT OFFICE.

HENRY HILD, OF CHICAGO, ILLINOIS.

DUMP-WAGON.

SPECIFICATION forming part of Letters Patent No. 440,034, dated November 4, 1890.

Application filed February 12, 1890. Serial No. 340,175. (No model.)

*To all whom it may concern:*

Be it known that I, HENRY HILD, a citizen of the United States, residing at Chicago, in the county of Cook and State of Illinois, have invented a new and useful Improvement in Dump-Wagons, of which the following is a specification.

My invention relates to dump-wagons in which the load of dirt is carried by means of one or more boxes, which are arranged on a wagon in such a manner that the boxes can be easily filled or quickly emptied, or the boxes entirely removed, so that the wagon can be utilized for other purposes when necessary.

One object is to give the dump-boxes a decidedly rhomboidal form in longitudinal vertical section, so that several boxes can be placed one behind the other in close contact and yet easily turn on their trunnions when being dumped or when being turned to the loading position, as will be described.

Another object is to so place the trunnions upon which the dump-boxes turn that the load of dirt will be dumped by its own weight, and at the same time the dump-boxes when empty will be practically balanced on the trunnions, so that the boxes can be easily turned all at one time, if necessary, to loading position by the driver without leaving his seat.

Another object is to provide a perfectly reliable means by which all the boxes are locked in the loading position simultaneously and automatically when thrown up to loading position; also, by the same means all the boxes can be dumped simultaneously by the driver from his seat, and, in addition, the locking mechanism is so arranged that with slight change single boxes can be dumped when necessary without interfering with the others.

Another object is to provide a combined reach and frame which not only connects the rear and front axles of the wagon without the usual coupling-pole or other obstruction under the wagon; but this part also forms a substantial bearing upon which the dump-boxes rest.

Another object is to connect all the boxes together, so that they can be turned to the loading position simultaneously by the driver without leaving his seat, and in also arranging this connection so that any one or all of the boxes can be disconnected from the others when necessary in dumping one box at a time.

A still further object is a new combination of parts for the purpose hereinbefore named which will not be liable under severe duty to often become inoperative, and which can be easily managed by ordinary unskilled help, and be placed on the market at a cost within the reach of persons of ordinary means. I accomplish these objects by the mechanism illustrated in the accompanying drawings, in which—

Figure 1 is a side view of the dump-wagon, showing dump-boxes in position ready for a load, also shows position of boxes when unloading in dotted lines. Fig. 2 is a top view of Fig. 1, showing position of frame, boxes, &c. Fig. 3 is an end view of the wagon with the wheels removed. Fig. 4 is a perspective view of one of the dump-boxes. Fig. 5 is a view of the means for locking the dump-boxes in loading position. Fig. 6 is a view of a box-locking mechanism in perspective. Fig. 7 is a perspective view of rod to connect the boxes together.

Similar letters refer to like parts throughout the several views.

It will be understood that where I use the word "dirt" in this specification that any other material that can be loaded in the dump-boxes is also meant.

A is a combined reach and frame, which is usually made of channel wrought-iron or steel, as shown in Fig. 6, and this part not only bears the weight of the several dump-boxes B, but also acts to connect the front and rear axles, acting as a reach, and being placed at the sides and ends of the dump-boxes B leaves the under side of the boxes clear of any obstruction, so that they can drop their load without the least hinderance. Although this part A acts the double purpose above mentioned, for brevity I will call it the "frame" in the description hereinafter.

At the top of the frame A are several journal-bearings $a$, into which are journaled the ends of the trunnions $a'$. These trunnions $a'$ have a flange C at the end, which contacts with the sides of the boxes near the center of length and width, as is plainly shown by the drawings. This flange C is riveted to the side of the boxes B, as shown in Fig. 4. The trunnions have a collar $a''$ at the outer end.

The frame A is attached to the rear axle D by means of bars E—one on each side—Figs. 1 and 3, and are bent at a right angle, Fig. 3, and their top end is secured to the frame A and their lower end is secured to the rear axle by means of clips $d$.

The frame A is braced longitudinally on both sides by means of braces $e$ and $e'$, which have their lower ends attached to the rear axle D and their upper ends attached to the frame A, Fig. 1.

The frame A at the rear end is provided with a cross-piece F, whose ends are secured to the rear ends of the frame A, and attached to this cross-piece F is a piece of sheet metal G, of a width and length greater than the end of the rear dumb-box B, which, being an open end, the sheet G acts as a cover when the box is closed ready for a load, Figs. 1, 2, and 3. At the front end of the wagon the frame A, at both sides of the wagon, is bent upward at H, then downward at I, forming an arch, which is higher than the front wheels J, so that the front wheels can pass under the frame A when it is necessary to make a short turn with the wagon. The front ends of the frame A are also bent inward on both sides, and are secured to a piece K, which serves the purpose of a fifth-wheel.

The frame A is braced at the front end by means of two braces $g$ and $h$, Fig. 2, which act to prevent any change of form in the frame, either transversely or longitudinally.

The dump-boxes B are usually made of sheet metal, and are open at the top and at one end, Fig. 4. The open end of these boxes is placed toward the rear end of the wagon. The front and rear ends of the sides of the boxes B are beveled, so that the sides of the boxes have a rhomboidal shape, Figs. 1 and 4, and this rhomboidal shape is imparted to the whole box in a side view, Fig. 1. This rhomboidal shape is necessary to give clearance at the ends of the boxes, since they fold up close at the ends. The rear closed end of the second box forms an end for the open end of the first box from the front of the wagon. The sheet of metal G, which is firmly secured in an angular position at the rear end of the wagon, acts to close the open end of the last box when this box is closed, as in Fig. 1. All the boxes are connected together by the rod L, Figs. 1 and 7, so that they can be turned up to a loading position by simply pulling the front box into position, which can be done by the driver from his seat at $u$. This rod L is pivotally connected to each of the boxes, so that it can be easily removed when it is necessary to dump the boxes B singly. The trunnions $a'$ are secured on the sides of the boxes B near the center of width between the top and bottom, so that the boxes will hang nearly in balance when turned in any position on the trunnions required in practice, and this position of the trunnions will also give the boxes a position nearer the ground on any given height of wagon, so that the dirt will not have to be lifted so high as is necessary in dump-wagons having the boxes hung to trunnions that are secured to the boxes on a level with their bottom. The position of these trunnions $a'$ in regard to the length of the boxes B is to one side of the center of the length toward the closed end of the boxes, for the purpose as will be explained. It will be noticed that the boxes B having one end open, the closed end overbalances the boxes should the trunnions be placed in the center of length of the boxes, and to obviate this the trunnions are so placed that the boxes will hang in balance. This is also done for another purpose. When the boxes are full of dirt, the center of gravity of the load will be on the side of the trunnions toward the open end of the boxes B, so that when the dump-boxes are unlocked in the act of dumping the preponderance of the load on the open end of the boxes will cause them to turn on their trunnions, and taking the position shown by the dotted lines, Fig. 1, the dirt in the boxes will fall out upon the ground.

The means for locking the boxes in position (shown in Fig. 1) for loading and for unlocking the boxes to cause them to automatically dump the load is shown in Fig. 1; but the details are shown on a larger scale in Figs. 5 and 6.

In Fig. 4 is shown a wedge-shaped piece $i$, secured to the side of the box. This part $i$ acts as a hasp for the lever-latch $k$, Figs. 1, 2, 5, and 6. The latch $k$ is an elbow-lever, and one of its arms $l$, Fig. 5, vibrates in a longitudinal slot $m$, Figs. 5 and 6, which is cut through the side of the frame A. The end of the lever $l$, when in position to catch the hasp $i$ of boxes B, projects through the slot in the frame A, Fig. 5, left-hand end of drawings. The arm $n$ of the latch $k$ has a slotted hole $o$, Fig. 6, passing horizontally through it, and operating through this hole $o$ is a rod $p$, which has stops $q$—one stop for each latch to be operated—Figs. 5 and 6. At $r$, Figs. 5 and 6, is a spiral spring, one end of which is attached to the arm $n$ of the latch $k$, and the other end of the spring is attached to the side of the frame A, as shown. The spring $r$ holds the latch-arm $l$ inward and in engagement or ready to engage the hasp $i$ on the side of boxes B. The rod $p$ passes through the slotted holes $o$ of each of the latches $k$, and its front end is pivotally connected to a hand-lever $s$, Figs. 1 and 2, which lever is pivotally connected to the frame A at $t$ within easy reach of the driver on seat $u$, Fig. 1. The stops $q$ on the rod $p$ contact with the latch $k$ only on the rear side, as shown.

In operating this dump-wagon the boxes B are all placed in the position shown in Fig. 1, with the hasps $i$ of the boxes B resting upon the inward-projecting latch-arms $l$, which effectually prevents the boxes from turning upon their trunnions. If a load of dirt is placed in the boxes B, a part of the weight of the dirt will bear upon the protruding latch-arms $l$, Fig. 5, left-hand latch $k$, and when the wagon is taken to the place of deposit the driver lifts upward upon the lever $s$, Figs. 1 and 2, and this causes rod $p$ to move forward until its stops $q$ contact with the arms $n$ of latch $k$ and cause arm $l$ to move outward and release hasp $i$ on the sides of the boxes B, when the boxes will turn on their trunnions and take the position shown in the dotted lines, Fig. 1, with the open end down, the dirt sliding out by gravity, as has been stated. If the boxes are now turned back to their original position, they will automatically lock themselves in the loading position, Fig. 1. It will be noticed that each of the latches $k$ is independent in its action when the boxes are being turned up to the loading position. The spiral spring $r$ holds the latches $k$ in contact with the stops $q$ on the rod $p$; but if it is desired to turn up one dump-box at a time connection L can be taken off to permit this, when either of the latch-arms $n$ will be free to move forward on the rod $p$ forward of stops $q$, as is shown in Fig. 5, left-hand latch $k$.

By the described combination of parts this wagon can be made so that the tops of the dump-boxes are not very high from the ground. Consequently the dirt is not lifted very high when the wagon is being loaded, thus saving a great expenditure of labor when compared to ordinary dump-wagons.
The arch in the frame in front in my wagon also is a valuable feature, since it permits very short turns when dumping is done in a very contracted space.

What I claim as my invention, and desire to secure by Letters Patent, is—

1. In a dump-wagon, the elbow-latch lever $k$, having arms $n$ and $l$, said arm $l$ operating in slot $m$ through the side of frame A, said lever $n$ having a slot $o$, rod $p$, operating in said slot $o$, said rod $p$ having stops $q$, said arm $n$ contacting with said stops $q$ through the action of spring $r$, said rod $p$ operated by lever $s$, when the whole is arranged in combination with the hasp $i$ or its equivalent on the sides of dump-boxes B, for the purpose described.

2. In a dump-wagon, the described rhomboidal-shaped dump-boxes B, hung upon trunnions near the center of width and length, as hereinbefore described, said trunnions $a'$ operating in boxes $a$, said boxes being secured to frame A, hasps $i$, secured at the side of boxes B, and latches $k$, operating in slots $m$ of frame A, in combination with said hasps $i$, all for the purpose and operating in the manner as described.

HENRY HILD.

Witnesses:
E. J. MOYUS,
G. C. BRAUNS.